United States Patent Office 3,283,380
Patented Nov. 8, 1966

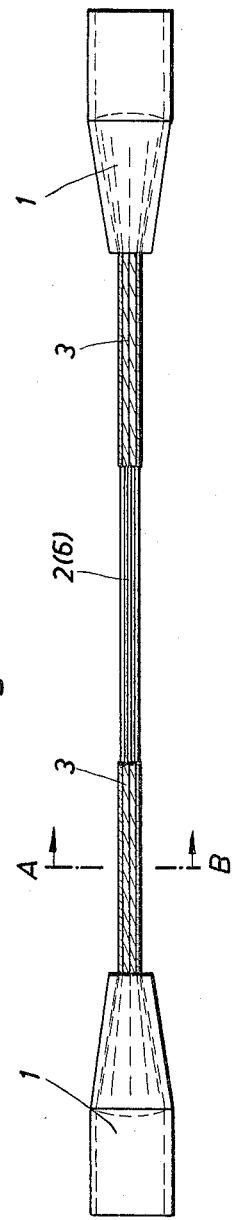
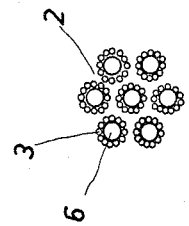
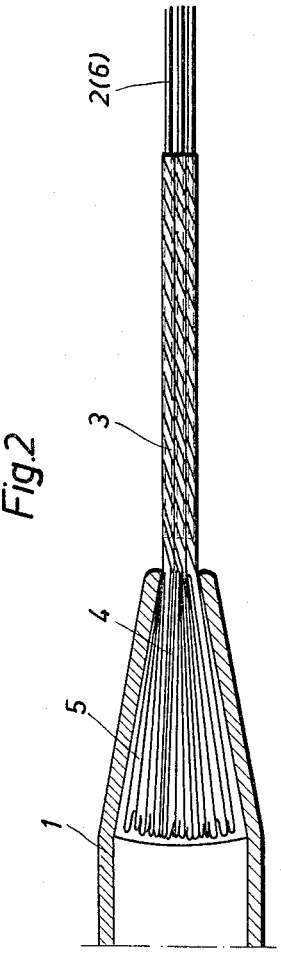

3,283,380
GUY ROPE OF GLASS-FIBER REINFORCED PLASTIC RODS
Hans-Jürgen Gassner, Mannheim-Lindenhof, Germany, assignor to Brown, Boveri & Cie Aktiengesellschaft, Mannheim-Kafertal, Germany, a corporation of Germany
Filed Mar. 19, 1965, Ser. No. 441,268
Claims priority, application Germany, Mar. 20, 1964, B 76,009
7 Claims. (Cl. 24—122.6)

My invention relates to guy ropes made of synthetic plastic reinforced by embedded glass fibers.

It is known to provide for pull-resistant anchoring of plastic rods by means of terminal clamps, shoes or the like devices which exert a uniform clamping pressure per unit area over the entire length of rod being clamped in the terminal device. It is a considerable disadvantage of such devices that the clamping pressure overstresses the plastic material of the rods at the opening of the device where the rope or bunch of rods leaves the clamping location. This danger is particularly great with plastic rods reinforced by embedded glass fibers because glass fibers, although withstanding relatively high pulling stresses, are rather brittle and hence very sensitive to transverse shearing stresses. A fissure originally occurring in the bunch or rope of plastic rods at the outlet locality of a terminal clamp, propagates itself within the strand of fibers when the stress upon the rope continues, and then leads to total breakage. The use of the known clamping devices, therefore, does not permit fully utilizing the high qualities of ropes made of glass-fiber reinforced synthetic plastics.

It is an object of my invention to eliminate this shortcoming and to provide a guy rope of glass-fiber reinforced plastic rods in which the optimal or maximal strength of the rod material is utilized virtually to the full extent.

According to the invention, a helical winding of steel wire is tightly seated on an elongated portion at each end of each of the rods of which the entire bunch or rope is formed. Each of the two terminal shoes located at the respective rope ends has an inner space tapering to the opening through which the rope enters into the shoe. The ends of the rods with the steel wire wound thereupon are bunched together in the conical shoe space and anchored therein by means of a casting mass consisting, for example, of metal alloys, ceramic cement such as a Portland cement mixture or sulphur cement mixture, or also of synthetic plastics such as the commercially available potting or casting resins. The steel wires, extending out of the shoe opening along an adjacent longitudinal portion of the bunch of rods, are preferably pre-shaped to the helical configuration and then placed upon each rod so as to be subjected to pre-tension in order to provide for tight frictional seating on the rod.

According to another feature of my invention, the steel wires surrounding the ends of the individual plastic rods have their ends spreading away from each other inside the conical portion of the casting mass, and the tips of the wire ends are preferably bent angularly or to a U-shaped configuration for improving the anchorage.

According to still another feature of my invention, the above-mentioned steel wires at each end of the respective rods for transferring the pulling forces to the rope shoe, are designed as a contractible pulling hose or sleeve. For example, the metal sleeves, consisting of a weave or mesh work of steel wire, have one end shoved over the respective plastic rods, whereas the other end protrudes into the conical inner space of the rope shoe where it is anchored by the casting mass.

The invention will be further described with reference to an embodiment of a guy rope according to the invention illustrated by way of example on the accompanying drawing, in which:

FIG. 1 shows schematically the rope by a longitudinal view.

FIG. 2 is a longitudinal section through a portion of the same rope; and

FIG. 3 shows schematically a cross section along the line A–B in FIG. 3.

The guy rope comprises two terminal shoes 1, each having a conical inner space tapering toward the shoe opening through which the end of the rope proper enters into the shoe. The hooks, eyes or other means with which such shoes are usually provided for fastening or suspending them are not shown. The ends of the rope 2 proper are anchored in each terminal shoe by means of a casting mass which fills the interior space of each shoe. The rope is composed of a number of individual rods formed of glass-fiber reinforced synthetic plastic. The end portions of each individual rod are surrounded by a helical wire 3 of steel. The helical winding extends from within each terminal shoe over an elongated portion of the rope outside of the shoe.

As shown in FIG. 2, the rods 6 of the rope 2 terminate shortly ahead of the terminal shoe 1, and only the helically pre-shaped wires of steel 3 pass into the interior of the shoe 1 where they are spread apart to form a brush-shaped cone 4. Furthermore, the utmost ends of the individual steel wires 3 are bent to U-shaped hooks for improving the stability of the anchoring engagement.

As shown in FIG. 3, the particular rope illustrated comprises a total of seven rods 6 of which six are distributed about a central rod. Each individual rod 6 is provided with twelve steel wires, for example of circular cross section, which form alternate turns of a helical sleeve. This sleeve is placed upon the end portion of the rod with some pre-tension so that a considerable amount of friction between the plastic rods 6 and the surrounding steel wires 3 is effective even in the unstressed condition of the guy rope 2. As the rope 2 is gradually subjected to more and more tensile force, the pulling forces in the rope and consequently in the individual rods 2 of plastic material also increase, so that the sleeves formed of the steel wires 3 tend to become more tightly engaged with the individual rods. The pulling force transmitted from the rods 6 to the steel wires increases along the clamping distance within each wire sleeve. Within a given cross section, the clamping pressure increases with an increase of pulling force. In the opposite direction the clamping pressure decreases to zero at the free end of the spring hose formed by the steel wires 3. Consequently the problem resulting from the above-mentioned disadvantages of the known devices is largely solved with the aid of only few and simple components.

Guy ropes according to the invention as exemplified in FIGS. 1 to 3 may be modified within wide limits with respect to the number of the rods of plastic material being used and the design of the helical wires, depending upon the required strength of the particular guy rope. Thus, the number and diameter of the rods 6 as well as the number and diameter of the individual helical wires required for each rod is dependent upon the mechanical strength required of the guy rope. Upon a study of this disclosure, such and other modifications will be obvious to those skilled in the art and may result in embodiments other than particularly illustrated and described herein, without departing from the essential features of my invention and within the scope of the claims annexed hereto.

I claim:

1. A guy rope comprising a group of parallel rod members of glass-fiber reinforced plastic, helical windings of steel wire tightly seated on an elongated end portion at each end of each of said rods, two terminal shoes at the respective rope ends, each of said shoes having a conically tapering inner space with an opening at the narrow axial end, said rod end with said wire windings being bunched together, said windings extending through said opening into said conical shoe space, and an embedding mass anchoring said wire windings in said terminal shoe.

2. In a guy rope according to claim 1, said wires of said windings being angularly spread apart from one another inside said conical shoe space and within said anchoring mass.

3. In a guy rope according to claim 1, said anchoring mass in said terminal shoe consisting of an alloy.

4. In a guy rope according to claim 1, said anchoring mass in said terminal shoe consisting of a cement mixture.

5. In a guy rope according to claim 1, said anchoring mass in said terminal shoe consisting of synthetic plastic.

6. In a guy rope according to claim 1, said helical windings of wire being pre-stressed and in frictional pressure engagement with the rod material.

7. In a guy rope according to claim 1, said helical windings of wire forming a pull sleeve so that pulling force applied to the guy rope tends to diametrically contract said sleeves on said respective rods.

References Cited by the Examiner
UNITED STATES PATENTS

| | | | |
|---|---|---|---|
| 1,686,250 | 10/1928 | Page | 24—123.5 |
| 2,043,341 | 6/1936 | Turechek. | |
| 3,015,512 | 1/1962 | Oakes | 287—80 X |

BERNARD A. GELAK, *Primary Examiner.*